United States Patent [19]

Panto et al.

[11] 4,402,703
[45] Sep. 6, 1983

[54] BLEED RESISTANT COLORED CREPE PAPER AND THE METHOD OF ITS PREPARATION

[75] Inventors: Joseph S. Panto, Dover; Ernest R. Kaswell, Waban, both of Mass.

[73] Assignee: Albany International Corp., Albany, N.Y.

[21] Appl. No.: 337,464

[22] Filed: Jan. 6, 1982

[51] Int. Cl.$^3$ .................... D21H 1/46; D06P 1/382
[52] U.S. Cl. .......................... 8/541; 8/542; 8/919
[58] Field of Search ............... 8/541, 542, 919

[56] References Cited

U.S. PATENT DOCUMENTS

| | | | |
|---|---|---|---|
| 3,084,017 | 4/1963 | Reeves et al. | 8/541 |
| 3,197,269 | 7/1965 | Drake et al. | 8/541 |
| 3,511,590 | 5/1970 | Gunst et al. | 8/919 |
| 3,684,428 | 8/1972 | Homuth et al. | 8/541 |

OTHER PUBLICATIONS

Lutzel, Jour. of Soc. of Dyers & Colorists, vol. 82, No. 8, Aug. 1966.

*Primary Examiner*—Maria Parrish Tungol
*Attorney, Agent, or Firm*—Kane, Dalsimer, Kane, Sullivan & Kurucz

[57] ABSTRACT

There is disclosed a method for bleed-resistant coloring of cellulosic materials. The articles prepared by the method of the invention are bleed resistant, colored cellulosics.

3 Claims, 1 Drawing Figure

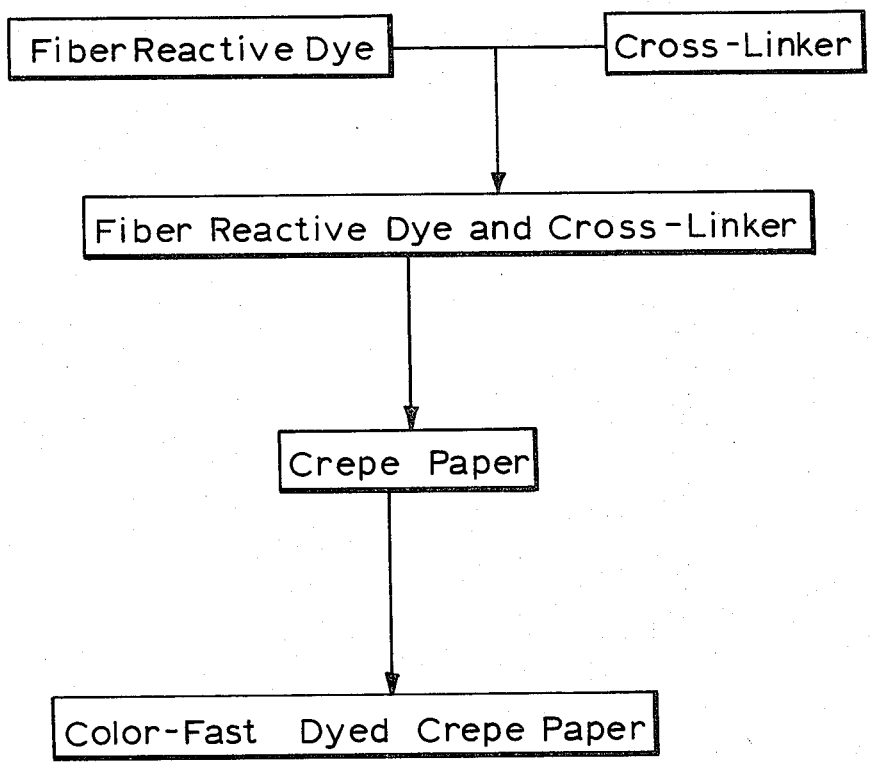

BLEED RESISTANT COLORED CREPE PAPER AND THE METHOD OF ITS PREPARATION

BACKGROUND OF THE INVENTION

1. Field of the Invention

The invention relates to the coloring of cellulosics, inclusive of color printing techniques, and more particularly relates to the coloring of cellulosics with chemically reactive dyes to obtain bleed resistant, colored cellulosic articles.

2. Brief Description of the Prior Art

The U.S. Pat. Nos. 1,732,540; 1,805,013; 1,863,813; 1,871,647; and 1,871,769 are representative of descriptions of prior art methods and practices for preparing so-called color fast, colored cellulosic articles. In spite of the known art for preparing colored cellulosic articles, there is a considerable amount of commercially available articles such as crepe paper, colored with dyes, that "bleed" when put into contact with water. By "bleeding" we mean that the color leaches out of the paper and may stain whatever the wet paper comes into contact with. This effect is considered undesirable for many uses of crepe paper. Apparently the known prior art methods of preparing color fast dyes cellulosics have not been found practical, sufficient or efficient for present day practices.

Prior to our invention, a class of dyes (reactive dyes for cellulosics) were known, which react with free hydroxyl groups on cellulosic fibers to cause a coloring thereof. However, the fibers must be free of contaminants such as starch, which would also react with the dye to form colored, insoluble particles on the fiber surface. The starch/dye reaction product is readily washed off of the fiber surface, resulting in a waste of dye reactant. Another disadvantage is found in the long reaction times needed to affect a coloration, i.e.; 20 to 30 minutes at elevated temperatures. In another way to use such dyes (to dye paper, for example), this class of reactive dye may be added to the paper pulp in the beater stage to permit reaction with cellulose over a prolonged period of time. The dyed pulp is then made into a paper sheet. The resulting colored paper is color fast (bleed resistant). The disadvantage of this approach is that a considerable amount of a given colored paper has to be made at one time (for economic reasons), and thus an inventory must be maintained until demand depletes it. This is a costly procedure.

By the method of this invention the reactive dyes may be first reacted with a cross-linking agent such as a melamine-formaldehyde resin. The resulting colorant compound is then used to impregnate preformed cellulosic articles such as crepe paper and then further reacted with the paper to chemically crosslink the dye to the crepe paper. The result is a colored crepe paper sheet which resists "bleeding" when placed in contact with water. The method of the invention is economical and may be used in a conventional plant for commercial coloration without purchasing new equipment or modifying that already in existence. Reaction times required are relatively short, which is an unexpected advantage. The method of the invention may also be carried out at relatively low temperatures, rapidly. Thus there are operating and economic advantages. The coloring approach described above may be used on a wide variety of woven and non-woven disposable cellulosic items where non-bleeding is a useful factor (for example, tissue paper, towelling, rayon sheets, crepe paper and the like).

Our observations made while coloring crepe paper indicated that the color dispersions used in the method of the invention can be used for printing on the surfaces of cellulosic articles. Prior to the invention, a considerable amount of color printing on low cost substrates was accomplished with either resin bonded pigments or solvent based inks. Both of these systems operate on a common principle, that is, attachment of the colorant to a substrate using a binder. Resin bonded systems are comprised of highly dispersed water insoluble pigments in water based emulsions. An acrylic emulsion is most commonly used in such systems. Preparation of the print paste involves addition of suitable thickeners to achieve good definition of the print, then drying to coalesce and adhere the pigment particles to the substrate. Solvent based systems are comprised of solvated dyes and lacquers. Preparation of the print paste involves addition of suitable thickeners to achieve good definition of print, then drying to evaporate the solvent and permit the lacquer to hold the colorant on a substrate. Both of the above described systems are expensive. For the printing of low cost items such as paper, paperboard, gift wrapping paper, textiles or other disposable items, the method of the invention is advantageous since it adds little to the overall cost of manufacture. The method of the invention is not limited however to the coloring or printing of low cost disposable cellulosics but may be used to color even more expensive articles such as textile fabrics, including woven, non-woven, knitted, pile and velvet fabrics, webs and yarns. By the method of the invention the printing of cotton fabrics is particularly advantageous. For example, the cotton fabric need not of necessity be prewashed to remove starch contaminants.

By the method of our invention a particular class of dyes referred to as "reactive dyes for cellulosics", which will react with cross-linker chemicals containing, for example, amino or hydroxyl groups, are used to form reactive colorant molecules which may be used as a coloring or a printing medium. The advantages are clear in that the water-based system used in the method of the invention has produced a good definition of print. This is of economic importance since currently used organic solvent based systems present occupational and fire hazards and problems of environmental pollution.

In addition, an inert flame retardant may be added to the print pastes or coloring mixtures used in the method of the invention to render the cellulosic articles non-flammable.

SUMMARY OF THE INVENTION

The invention comprises a method of coloring preformed cellulosic articles, which comprises; chemically crosslinking a reactive dye molecule to the cellulosic article. The term "coloring" as used herein includes printing, i.e.; the coloring of selected areas of a cellulosic article. The invention also comprises the bleed resistant colored products of the method of the invention and intermediate coloring materials used in their preparation.

BRIEF DESCRIPTION OF THE DRAWING

The accompanying drawing is a block diagram outlining a preferred embodiment method of the invention.

DETAILED DESCRIPTION OF THE PREFERRED EMBODIMENTS OF THE INVENTION

In the accompanying diagram, there is illustrated schematically an embodiment method of the invention for coloring crepe paper to obtain a color-fast (bleed resistant) crepe paper. Although the method is described in regard to the coloring of crepe paper it will be appreciated that the method of the invention applies to the coloring of any like cellulosic articles such as tissue paper, towelling, non-wovens and like articles.

Cellulosic articles may be colored by the method of the invention to obtain colored articles which resist color bleeding upon contact with water. The term "cellulosic article" as used herein means natural or synthetic preformed articles made from materials such as those containing a polymeric structure with repeating moieties of the formula:

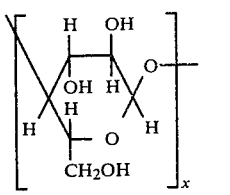

(I)

wherein x is an integer which is an average of about 3,000. Representative of such cellulosic materials are cotton, paper, rayon and the like. The method of the invention is particularly advantageous for coloring crepe paper to obtain a color fast product, i.e.; colored crepe paper resistant to color bleeding.

The coloring of the cellulosic is carried out by chemically cross-linking to the cellulosic, through its free hydroxyl groups, a reactive dye molecule.

As illustrated in the accompanying drawing, the cellulosic (crepe paper) is impregnated with a mixture of a reactive dye and a chemical cross-linker. The cellulosic can be impregnated with the two reactants separately in any order or sequence or, preferably, the cross-linker is added to the dye component and the impregnation carried out in a single step. In the latter case, the cross-linker is first added to the dye component and may be partially reacted with the dye. Impregnation may be carried out by conventional techniques such as by spraying the impregnants on the cellulosic, dipping the cellulosic in a bath of impregnant, by kiss roll-pad applicators and like techniques. The impregnants may also include besides the reactive dye and crosslinker, conventional additives such as wetting agents, sizes, fire retardants and the like commonly used in the art to dye or color cellulosic materials.

Following impregnation of the cellulosic, such as crepe paper, the desired cross-linking reaction is promoted by heating the impregnated cellulosic to a cross-linking temperature. In general, a cross-linking temperature is one within the range of from about 150° F. to 500° F. for periods of time between 10 seconds or less and an hour or more, depending on the particular heating techniques that are involved and the heat exchanging efficiencies that are realized. Heating may be carried out by exposure of the impregnated cellulosics to radiant heaters and like heat sources.

The proportion of coloring reactants impregnated into the cellulosic for reaction therewith are important in regard to the degree of color fast coloration to be achieved. If a relatively light shade of coloration is desired, only a relatively small proportion of the cross-linking reagent is necessary to provide the cross-linked product. Thus, from 5 to 350 percent by weight of the cross-linking reagent, based on the weight of the coloring component, is generally adequate for the cross-linking purpose. Frequently, an amount of the cross-linking reagent that is between 100 and 275 percent by weight, based on the weight of the dye component may be employed with advantage. If precision is desired, the exact quantity of the cross-linking reagent for accomplishment of the intented purpose can be calculated using trial and error techniques. For a deeper shade of dyeing, more than 350 percent (by weight of colorant) of cross-linker may be employed.

The cross-linking reaction which occurs may be illustrated in the schematic formula:

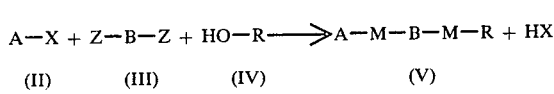

wherein the compound of formula (II) is a reactive dye (described more fully hereinafter), X being representative of a halogen; the compound of formula (III) is a representative polyfunctional cross-linker wherein B is a divalent organic moiety and Z is selected from the group consisting of amino and hydroxyl; and the formula (IV) represents a hydroxy containing cellulosic material as described above wherein R is the residue after removal of a hydroxy group. The resulting product of formula (V) is one wherein the dye component (II) is chemically bound to the cellulosic (IV) so as to be color fast (bleed resistant), M representing oxygen or a group of formula —NH—.

The cross-linking reagent employed in the method of the invention may be a di- or polyfunctional compound, provided the functional groups are capable of a cross-linking reaction between the free hydroxyl groups on the cellulosic (see for example the formula (I) given above) and the reactive, functional groups on the organic, reactive dye such as that of formula (II) given above. Representative of such cross-linking reagents are diols and diamines of the formula (III) given above wherein B is selected from the group consisting of (a) a straight chain, branched chain or cyclic alkylene radical containing from 2 to 12 carbon atoms and in which one or both of the Z groups may be present on a secondary carbon atom, (b) the group: —(CH$_2$)$_m$—O—Y—O—(CH$_2$)$_n$— wherein Y is a divalent radical selected from the class consisting of straight chain alkylene groups, branched chain alkylene groups, cyclic alkylene groups and oxydialkylene groups and wherein m and n have the value 2 to 4.

(c) the group:

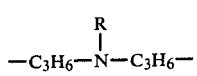

wherein R is a lower alkyl or phenyl group, and
(d) the group:

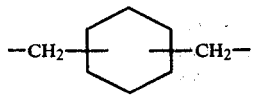

The diamines of class (a) above which may be satisfactorily employed in accordance with the invention are represented by ethylenediamine, 1,3-propanediamine, 1,2-propanediamine, 1,3-butanediamine, 1,5-hexanediamine, 1,3-diaminecyclohexane, 1,4-diaminocyclohexane, 1,3-cyclohexane-bis (methylamine) and the like.

The diamines of class (b) may be 3,3'-(ethylenedioxy) bis(propylamine), 3,3'-(2,2-dimethyltrimethylenedioxy) bis (propylamine), 3,3'-(cyclohexylene-1,4-dimethylenedioxy) bis (propylamine), of the formula:

$$H_2N(CH)_3-O-C_2H_4-O-(CH_2)_3-NH_2$$

and the like.

Likewise the diamines of class (c) may be 3,3'-ethyliminobis (propylamine) 3,3'-phenyliminobis (propylamine) and the like.

Similarly, the diamines of class (d) may be o-, m-, and o-xylene-diamines and the like.

Diols of class (a) above are represented by ethylene glycol, 1,3-propanediol, 1,3-butanediol, 1,4-dihydroxycyclohexane and the like.

The diols of class (b) above may be a poly (alkylene oxide) glycol or the like.

Diols of the class (c) given above are represented by 3,3'-ethyliminobis (propanol) and the like.

Diols of the class (d) given above are represented by o-, m-, p-xylene diols and the like.

Preferred cross-linkers (III) of the diol class are represented by dimethylol urea, dimethylol melamine, dimethylol methyltriazine, dimethylol cyclic ethylene urea (DCEU) and the like. The cross-linking reagents may also be represented by polyamines of the formula:

$$H_2N-(CNH-G)_n-NH_2$$

wherein G may be any $C_2$ to $C_{10}$ aliphatic or $C_6$ to $C_{14}$ aromatic radical and n is a whole integer of at least 1. Polyamines that may be included in this category include for example hexamethylene tetramine, diethylene triamine, triethylene tetramine and the like. Other functionally equivalent polyamine compounds such as piperazine and the various substituted piperazines and melamine, in which the nitrogen atoms are part of a heterocyclic molecular structure, may also be utilized as cross-linking reagents in the method of the invention.

Advantageously, the cross-linking reagent may be an aldehyde type of material such as furfural or glyoxal and the like, or a urea-formaldehyde or melamine formaldehyde polymer condensate of the usual resin precursor variety, i.e.; mono-or dimethylolurea and the like. It is generally desirable to employ as the cross-linking reagent a polymer which is a urea-formaldehyde or melamine-formaldehyde polymer condensate such as those which have been previously used in the treatment of paper to increase or impart wet strength to the paper fibers. It is believed that such resin cross-linkers form hydrogen bonds between the polymer chains, thereby increasing further the chemical bond strength; see Kirk Othmer, Encyclopedia of Chemistry, Vol. 2, pages 254–255. These urea-formaldehyde and melamine-formaldehyde polymer condensates contain (generally) both free hydroxyl and free amino groups which may function in the desired cross-linking reaction. Although we are not to be bound by any theory of the mechanism involved, it is believed that the free hydroxyl groups predominate in the cross-linking reaction.

The colored cellulosic of formula (V) is bleed resistant.

The reactive dye of formula (II) described above is an acid halide. Reactive dyes of the formula (II) are a class of dyes having active, functional, halogen groups which will react with active hydrogen atoms on the cross-linking agents described above to form chemical bonds between the dye moiety and the cross-linker. Representative of reactive dyes are those described in U.S. Pat. Nos. 3,290,282 and 3,503,953 which also describe their preparation. Preferred reactive dyes are those of the formulae:

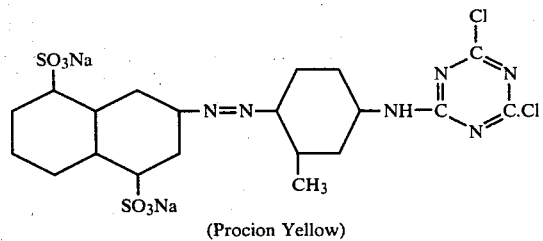
(Procion Yellow)

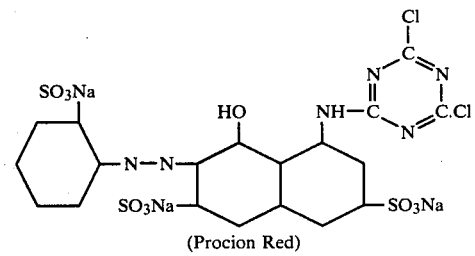
(Procion Red)

and

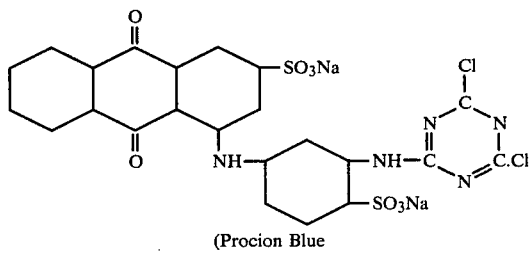
(Procion Blue)

and the like.

An important advantage of the method and the articles of the invention is found in their compatibility with the presence of conventional, inert flame retardants. Thus, inert flame retardants conventionally used to impregnate cellulosic articles may be added to the coloring compositions used to color cellulosics in the method of the invention. The term "inert flame retardant" means a flame retardant compound or composition which does not enter into the above-described cross-linking reaction or otherwise adversely affect the desired course of the cross-linking.

The process of the invention as described above may be used for printing on cellulosics and the coloring compositions are basically the same as used for dyeing crepe paper except that alkali such as sode ash is added to the impregnant to produce a desired viscosity. Any desired viscosity can be achieved by varying the proportion of alkali, as those skilled in the art will appreciate (viscosity increases as the pH is raised). In printing operations, the colorants are very suitable for use in the thermal process wherein the printing paste contains both the colorant and alkali and the print is cured by heating above 270° C. for 30 seconds or more. Thermal printing is a well known process and the techniques and apparatus are known and readily available.

The following examples describe the manner and process of making and using the invention and set forth the best mode contemplated by the inventors of carrying out the invention, but are not to be construed as limiting. Bleed resistance is determined by immersing a representative portion of the colored cellulosic article (crepe paper) in tap water and sandwiching the wet article between a top and a bottom layer of white tissue paper which layers are subsequently saturated with tap water. After a period of about 10 minutes the sandwich is opened and the amount of bleed, i.e.; migration of colorant from the colored article to the upper and lower tissue layers noted. The article is deemed "bleed resistant" if no color migration is seen.

EXAMPLE 1

A suitable vessel is charged with 5 gms of a melamine-formaldehyde resin (Berset 808-B, Bersen Chemical Co.) in 30 ml of water. The charge is heated with stirring to a temperature of 140° F. To the heated charge there is added with stirring 4 gms of Procion Blue MX-2GA (I.C.I. Americas Inc., Wilmington, Delaware) dissolved in 20 ml of hot (140° F.) water. The resulting mixture is mixed for 30 minutes while maintaining the temperature of 140° F. At the end of this period, the mixture is allowed to cool to room temperature and then 40 gms of a fire retardant (Apex Flameproof #736, Apex Chemical Co.) in 10 ml of water is added with stirring. To the resulting mixture there is added an additional 5 gms. of the melamineformaldehyde resin. Crepe paper is immersed in the resulting mixture and then removed. Excess dye solution is removed by passing the dye immersed paper between the rolls of a padder. The paper is cured at a temperature of 300° F. for one minute to obtain a bleed resistant, colored crepe paper.

EXAMPLE 2

A dye solution is prepared as described in Example 1, supra. except that the dye solution obtained is not used for immersion of crepe paper. Instead, there is added to the dye solution with stirring 0.8 gms. soda ash. The resulting viscous mixture is a printing paste. The printing paste is applied by screen to paper stock and the prints are cured by exposure to radiant heaters (temperature circa 350° F.) for 1.5 minutes. The resulting print is well defined and is bleed resistant.

What is claimed:

1. A method of coloring a crepe type paper, which comprises;
   (a) providing a reactive dye;
   (b) mixing said dye with a sufficient proportion of a cross-linker, to partially cross-link a portion of the dye molecules, said proportion being insufficient to cross-link all of the dye molecules;
   (c) partially cross-linking the portion of dye molecules;
   (d) adding additional cross-linker to the mixture of partially cross-linked reactive dye;
   (e) applying the product of step (d) above to the paper; and
   (f) chemically cross-linking said product to the paper.
2. The method of claim 1 wherein the cross-linker is a melamine-formaldehyde resin.
3. The method of claim 1 wherein the cross-linker is a urea-formaldehyde resin.

* * * * *

UNITED STATES PATENT AND TRADEMARK OFFICE
CERTIFICATE OF CORRECTION

PATENT NO. : 4,402,703
DATED : September 6, 1983
INVENTOR(S) : Joseph S. Panto et al It is certified that error appears in the above—identified patent and that said Letters Patent is hereby corrected as shown below:

At Col. 1, line 26; "dyes" should read -- dyed -- .

At Col. 4, line 9; after the word "between" insert -- about -- .

At Col. 4, line 13; "intented" should read -- intended -- .

At Col. 5, line 19; "$H_2N(CH)_3$" should read -- $H_2N(CH_2)_3$ -- .

At Col. 6, line 46; " 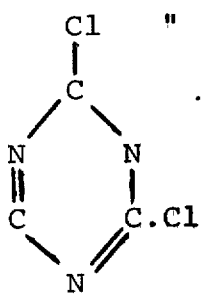 " should read -- 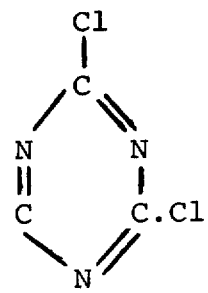 -- .

At Col. 6, line 68: "sode" should read -- soda --.

Signed and Sealed this

*Twenty-seventh* Day of *December 1983*

[SEAL]

*Attest:*

GERALD J. MOSSINGHOFF

*Attesting Officer*   *Commissioner of Patents and Trademarks*